(12) United States Patent
Fuke

(10) Patent No.: US 11,597,349 B2
(45) Date of Patent: Mar. 7, 2023

(54) VEHICLE OPERATION DEVICE, VEHICLE OPERATION METHOD, AND NON-TRANSITORY STORAGE MEDIUM STORING VEHICLE OPERATION PROGRAM

(71) Applicant: TOYOTA JIDOSHA KABUSHIKI KAISHA, Toyota (JP)

(72) Inventor: Jumpei Fuke, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 357 days.

(21) Appl. No.: 16/923,168

(22) Filed: Jul. 8, 2020

(65) Prior Publication Data

US 2021/0061223 A1 Mar. 4, 2021

(30) Foreign Application Priority Data

Sep. 4, 2019 (JP) .............................. JP2019-161422

(51) Int. Cl.
*B60R 25/24* (2013.01)
*B60R 25/01* (2013.01)
*B60R 25/104* (2013.01)

(52) U.S. Cl.
CPC .............. *B60R 25/24* (2013.01); *B60R 25/01* (2013.01); *B60R 25/104* (2013.01)

(58) Field of Classification Search
CPC ........ B60R 25/24; B60R 25/01; B60R 25/104
See application file for complete search history.

(56) References Cited

U.S. PATENT DOCUMENTS

| | | | |
|---|---|---|---|
| 10,351,100 B1* | 7/2019 | Hentschel | B60R 25/243 |
| 2005/0184855 A1* | 8/2005 | Burchette | B60R 25/252 340/5.72 |
| 2017/0178035 A1* | 6/2017 | Grimm | H04L 9/3213 |
| 2019/0025856 A1* | 1/2019 | Turato | B60W 10/06 |
| 2019/0028443 A1* | 1/2019 | Chin | G07C 9/00571 |

FOREIGN PATENT DOCUMENTS

JP 2015-215663 A 12/2015

* cited by examiner

*Primary Examiner* — Thomas D Alunkal
(74) *Attorney, Agent, or Firm* — Oliff PLC (57) ABSTRACT

A vehicle operation device includes memory and a processor. The processor is configured to store tokens received from a server in the memory to be used for authentication to a vehicle. When an operation of the vehicle is performed in a state in which communication with the server is possible, a token is used to conduct authentication to the vehicle. When a predetermined operation of the vehicle is performed in a state in which communication with the server is interrupted, authentication to the vehicle is conducted without using a token.

16 Claims, 7 Drawing Sheets

VEHICLE OPERATION DEVICE, VEHICLE OPERATION METHOD, AND NON-TRANSITORY STORAGE MEDIUM STORING VEHICLE OPERATION PROGRAM

CROSS-REFERENCE TO RELATED APPLICATION

This application is based on and claims priority under 35 USC 119 from Japanese Patent Application No. 2019-161422 filed on Sep. 4, 2019, the disclosure of which is incorporated by reference herein.

BACKGROUND

Technical Field

The present disclosure relates to a vehicle operation device, a vehicle operation method, and a non-transitory storage medium storing a vehicle operation program.

An authentication device for authenticating an application that controls an external device is disclosed in, for example, Japanese Patent Application Laid-Open (JP-A) No. 2015-215663. This authentication device issues an access token for the application. When operation signals for operating the external device are inputted from the application with the access token appended, the authentication device conducts authentication with the access token. When the access token has been authenticated, the authentication device updates the access token to generate a new access token, and sends the access token and the new access token to the application.

For example, with an application for car sharing or the like, the technology disclosed in JP-A No. 2015-215663 may be employed in a situation in which a terminal receives tokens from a server and the tokens are used for authentication of the terminal to a vehicle when operating the vehicle, such as locking and unlocking door locks of the vehicle and so forth. If communication between the terminal and the server is interrupted, this situation declines into a state in which there are insufficient tokens and it is not possible to operate the vehicle. Interruptions of communication between the terminal and the server may occur frequently when a user carrying the terminal is, for example, in an underground parking garage, outside an urban area and so forth.

SUMMARY

The present disclosure may suppress a decline into a state in which operation of a vehicle is not possible when communication with a server is interrupted.

A terminal according to a first aspect includes: a storage section that stores a token to be used for authentication to a vehicle, the token being received from a server; and an authentication section that, when an operation of the vehicle is performed in a state in which communication with the server is possible, uses the token to conduct authentication to the vehicle, and, when a predetermined operation of the vehicle is performed in a state in which communication with the server is interrupted, conducts authentication to the vehicle without using the token.

In the first aspect, when the terminal is in the state in which communication with the server is possible and an operation of the vehicle is performed, the terminal uses a token to conduct authentication to the vehicle. Alternatively, when the terminal is in the state in which communication with the server is interrupted and a predetermined operation of the vehicle is performed, the terminal conducts authentication to the vehicle without using a token. Therefore, unnecessary use of tokens when communication with the server is interrupted may be avoided, and a decline into a state in which operation of the vehicle is not possible may be suppressed.

In a second aspect, the predetermined operation of the first aspect is an operation with a low security risk to the vehicle.

In the second aspect, because an operation with a low security risk to the vehicle is being performed when authentication to the vehicle is conducted without using the token in the state in which communication with the server is interrupted, security of the vehicle may be improved.

In a third aspect, in the first aspect, when an operation of the vehicle other than the predetermined operation is performed in the state in which communication with the server is interrupted, the authentication section uses the token to conduct authentication to the vehicle.

In the third aspect, because a token is used to conduct authentication to the vehicle when an operation of the vehicle other than the predetermined operation(s) is performed in the state in which communication with the server is interrupted, security of the vehicle may be assured even though operations other than predetermined operation of the vehicle may be performed in the state in which communication with the server is interrupted.

In a fourth aspect, in the first aspect, when an operation of the vehicle is entered via an entry section of the terminal, the authentication section sends an operation command to the vehicle.

In the fourth aspect, because an operation command is sent to the vehicle when an operation of the vehicle is entered via the entry section of the terminal, the vehicle side may recognize that the operation of the vehicle has been entered via the entry section of the terminal.

In a fifth aspect, the first aspect further includes a notification section that, when a remaining number of tokens stored in the storage section is less than or equal to a predetermined value in the state in which communication with the server is interrupted, gives notice of the reduction in remaining tokens.

In the fifth aspect, when the remaining number of stored tokens is below the predetermined value in the state in which communication with the server is interrupted, giving notice of the reduction in remaining tokens may encourage a user carrying the terminal to promptly remedy the state in which communication with the server is interrupted.

In a sixth aspect, the notification section of the fifth aspect gives the notice by at least one of causing a display at a display section of the terminal or causing an output of sound from a sound output section of the terminal.

In the sixth aspect, because the reduction in remaining tokens is notified by making an impression on the vision or hearing of the user carrying the terminal, the user may assuredly be made aware of the reduction in remaining tokens.

In a seventh aspect, the storage section of the first aspect stores a plurality of tokens, the tokens being received from the server in the state in which communication with the server is possible.

In the seventh aspect, a duration until the remaining number of tokens stored in the storage section falls below the predetermined value may be made longer.

In an eighth aspect, the authentication section of the first aspect, when using the token to conduct authentication to the vehicle, uses a token that has not been used previously for authentication to the vehicle.

In the eighth aspect, because an unused token is employed each time a token is used to conduct authentication to the vehicle, security of the vehicle may be improved.

A vehicle operation system according to a ninth aspect includes the terminal of the first aspect and a vehicle side system provided at the vehicle. When an operation of the vehicle is performed, the vehicle side system controls an activation of vehicle side equipment after authentication of the terminal. When the predetermined operation of the vehicle is being performed in a state in which communication between the terminal and the server is interrupted, the vehicle side system conducts authentication of the terminal without using the token.

Because the ninth aspect includes the terminal according to any one of the first to eighth aspects and the vehicle side system, similarly to the first aspect, a decline into a state in which operation of the vehicle is not possible when communication with the server is interrupted may be suppressed.

A vehicle operation method according to a tenth aspect causes a computer to execute processing including: storing a token to be used for authentication to a vehicle in a storage section, the token being received from a server; when an operation of the vehicle is performed in a state in which communication with the server is possible, using the token to conduct authentication to the vehicle; and when a predetermined operation of the vehicle is performed in a state in which communication with the server is interrupted, conducting authentication to the vehicle without using the token. Thus, similarly to the first aspect, a decline into a state in which operation of the vehicle is not possible when communication with the server is interrupted may be suppressed.

A vehicle operation program according to an eleventh aspect causes processing to be executed including: storing a token to be used for authentication to a vehicle in a storage section, the token being received from a server; when an operation of the vehicle is performed in a state in which communication with the server is possible, using the token to conduct authentication to the vehicle; and when a predetermined operation of the vehicle is performed in a state in which communication with the server is interrupted, conducting authentication to the vehicle without using the token. Thus, similarly to the first aspect, a decline into a state in which operation of the vehicle is not possible when communication with the server is interrupted may be suppressed.

The present disclosure may suppress a decline into a state in which operation of a vehicle is not possible when communication with a server is interrupted.

BRIEF DESCRIPTION OF THE DRAWINGS

Exemplary embodiments of the present invention will be described in detail based on the following figures, wherein.

DETAILED DESCRIPTION

Herebelow, an example of an exemplary embodiment of the present disclosure is described in detail with reference to the attached drawings. A vehicle operation system 10 shown in FIG. 1 includes a smartphone 12, which is carried by a user who performs operations on a vehicle, and a vehicle side system 46 provided at the vehicle. The smartphone 12 is an example of a terminal that serves as a vehicle operation device.

Figure 1:
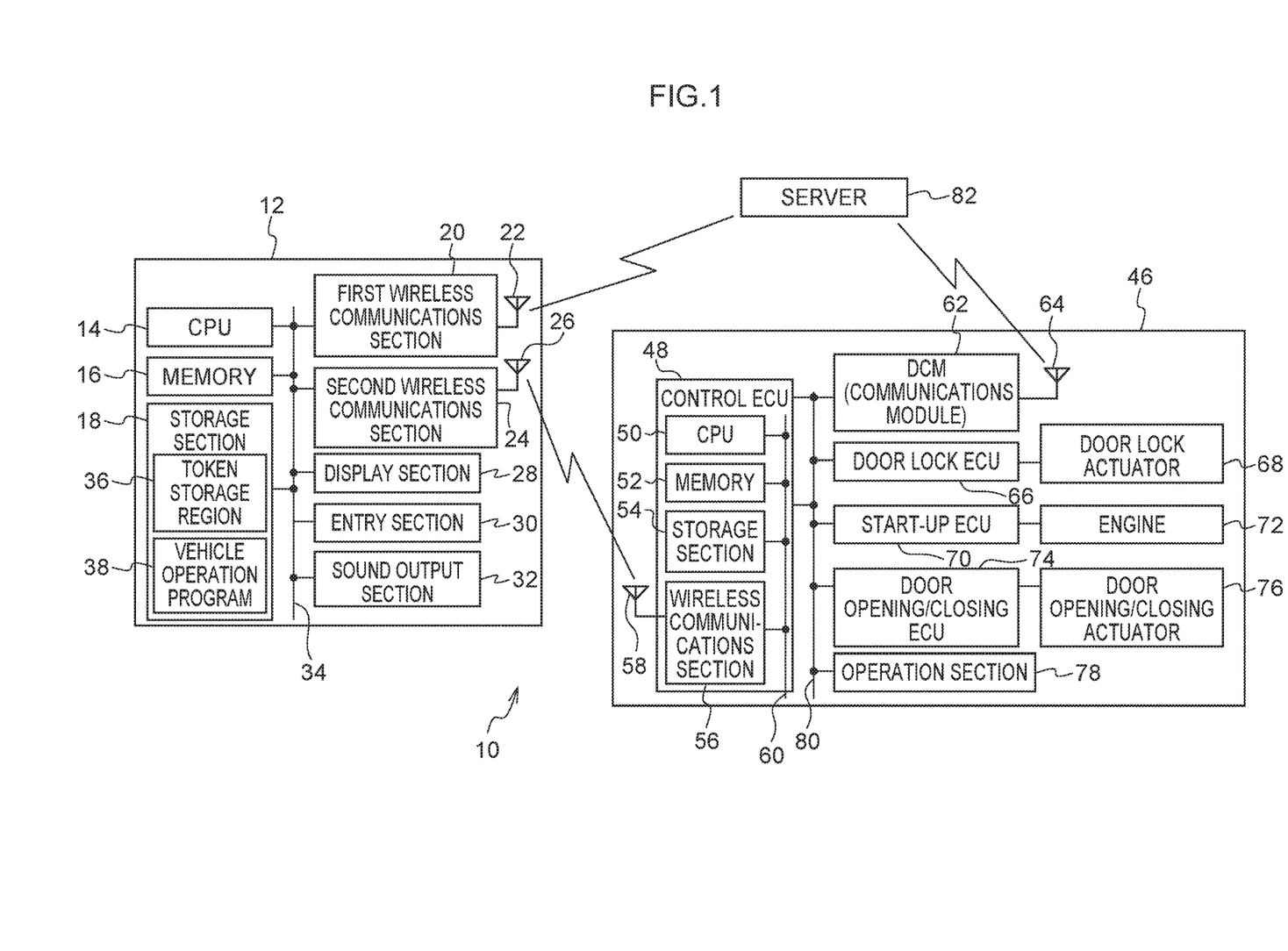
FIG. 1 is a block diagram showing schematic structures of a vehicle operation system according to an exemplary embodiment.

The smartphone 12 includes a central processing unit (CPU) 14, a memory 16 such as read-only memory (ROM), random access memory (RAM) and the like, and a storage section 18 such as a hard disk drive (HDD), solid state drive (SSD) or the like that serves as a non-volatile, non-transitory storage medium or memory. The smartphone 12 includes a first wireless communications section 20, a second wireless communications section 24, a display section 28 and entry section 30 constituting a touch panel, and a sound output section 32. The CPU 14, which serves as a processor, the memory 16, the storage section 18, the first wireless communications section 20, the second wireless communications section 24, the display section 28, the entry section 30 and the sound output section 32 are connected to be capable of communicating with one another via a bus 34.

The first wireless communications section 20 is connected to an antenna 22 and performs wireless communications with a server 82 via a wireless telephony network, which is not shown in the drawings. The server 82 generates tokens and distributes the tokens to the smartphone 12. A communications system for wireless communications between the first wireless communications section 20 and the server 82 may be, for example, LTE (Long Term Evolution), which is a 4G (fourth generation) communications standard, but this is not limiting; the wireless communications may conform with a communications standard for 3G (third generation), 5G (fifth generation) or the like.

The second wireless communications section 24 is connected to an antenna 26 and performs wireless communications with the vehicle side system 46. A communications system for wireless communications between the second wireless communications section 24 and the vehicle side system 46 may be, for example, BLE (Bluetooth (registered trademark) Low Energy), and the wireless communications may conform to an alternative short-range wireless communications standard.

Figure 2:
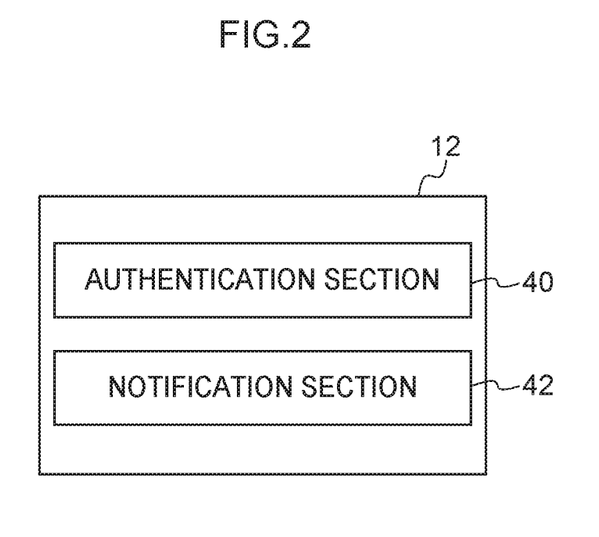
FIG. 2 is a functional block diagram of a smartphone.

The storage section 18 is provided with a token storage region 36 for storing tokens received from the server 82. A vehicle operation program 38 is stored (installed) at the storage section 18. The vehicle operation program 38 is read out from the storage section 18 and loaded into the memory 16, and is executed by the CPU 14. Thus, the CPU 14 functions as examples of both an authentication section 40 and a notification section 42 shown in FIG. 2, and the CPU 14 performs token management processing and vehicle operation processing, which are described below.

The vehicle side system 46 includes a control ECU (electronic control unit) 48, a data communication module (DCM) 62, a door lock ECU 66, a start-up ECU 70, a door opening/closing ECU 74, and an operation section 78. The control ECU 48, DCM 62, door lock ECU 66, start-up ECU 70, door opening/closing ECU 74, and operation section 78 are connected to be capable of communicating with one another via a bus 80.

The control ECU 48 includes a CPU 50, a memory 52, a storage section 54 and a wireless communications section 56. The CPU 50, memory 52, storage section 54 and wireless communications section 56 are connected to be capable of communicating with one another via an internal bus 60. The wireless communications section 56 is connected to an antenna 58 and conducts wireless communications with the smartphone 12 that conform to a communications standard such as BLE or the like. Logic that generates tokens is embedded at the control ECU 48.

The DCM 62 is connected to an antenna 64 and conducts wireless communications, conforming to a communications standard such as LTE or the like, with the server 82 via a wireless telephony network that is not shown in the drawings.

The door lock ECU 66 includes a CPU similar to the control ECU 48 or the like, a memory and a storage section. The door lock ECU 66 is connected to a door lock actuator (ACT) 68. The door lock actuator 68 is capable of switching a door lock between a locked state and an unlocked state. Activation of the door lock actuator 68 is controlled by the door lock ECU 66. The door lock ECU 66 and door lock actuator 68 are an example of vehicle side equipment.

The start-up ECU 70 includes a CPU similar to the control ECU 48 or the like, a memory and a storage section. The start-up ECU 70 is electronically connected to an engine 72 of the vehicle, and controls starting of the engine 72 and the like. In the present exemplary embodiment, the vehicle in which the vehicle side system 46 is installed may be a vehicle whose drive source is the engine 72, and may be a hybrid vehicle (HV). When the engine 72 is the drive source of the vehicle, the start-up ECU 70 controls, for example, fuel injection of the engine 72 and the like. When the vehicle is a hybrid vehicle, the start-up ECU 70 controls, for example, starting and stopping of the engine 72 and the like. The start-up ECU 70 and engine 72 are an example of vehicle side equipment.

The door opening/closing ECU 74 includes a CPU similar to the control ECU 48 or the like, a memory and a storage section. The door opening/closing ECU 74 is connected to a door opening/closing actuator 76. The door opening/closing actuator 76 is capable of opening and closing a door of the vehicle (for example, a sliding door at a rear seat of the vehicle, a back door or the like). Activation of the door opening/closing actuator 76 is controlled by the door opening/closing ECU 74. The door opening/closing ECU 74 and door opening/closing actuator 76 are an example of vehicle side equipment.

The operation section 78 includes a door lock operation button attached to a door handle, an engine starter switch provided at an instrument panel of the vehicle, and so forth.

The server 82 includes a CPU, a memory and a storage section. Logic that generates tokens is embedded at the server 82. When a token is requested by the smartphone 12, the server 82 performs processing to generate a plural number of tokens and distribute the tokens to the smartphone 12.

Figure 3:
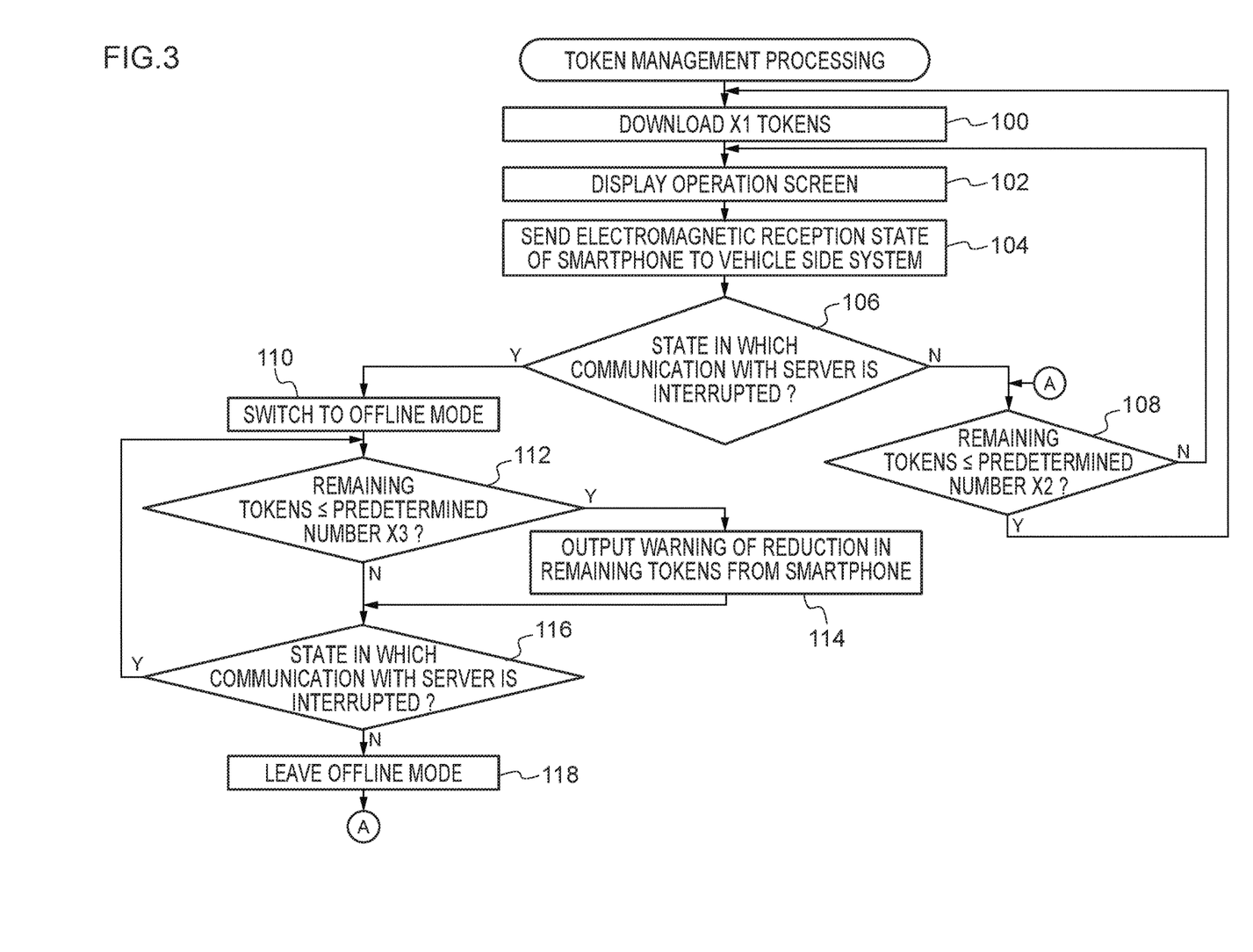
FIG. 3 is a flowchart of token management processing that is executed at the smartphone.

Now, operation of the present exemplary embodiment is described. For example, when a user decides to use car sharing or the like and perform some operations on a vehicle at which the vehicle side system 46 is provided, the user downloads the vehicle operation program 38 from the server 82, installs the vehicle operation program 38 in the smartphone 12, and performs the operations. When installation of the vehicle operation program 38 is complete, the user launches the vehicle operation program 38 and performs operations. Accordingly, the token management processing illustrated in FIG. 3 is executed by the smartphone 12.

In step 100 of the token management processing, the authentication section 40 makes a request to the server 82 for the distribution of tokens, and the authentication section 40 downloads a number X1 (for example, 100) of tokens generated by the server 82 in response to the request from the server 82. The authentication section 40 stores the tokens downloaded from the server 82 in the token storage region 36 of the storage section 18.

Figure 4:
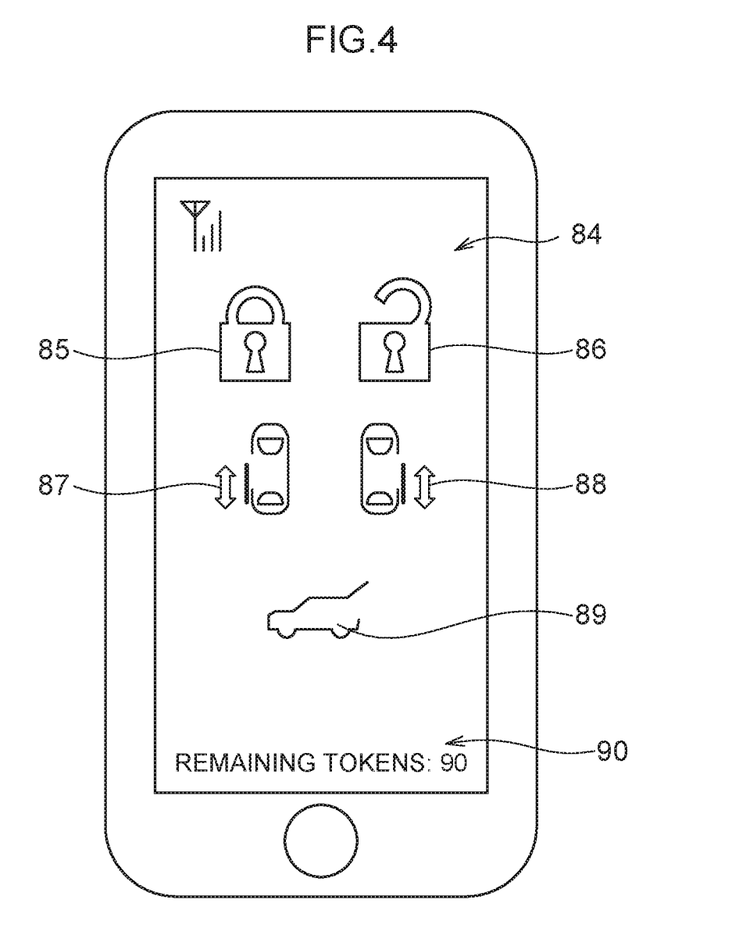
FIG. 4 is an image showing an operation screen that is displayed at a display section of the smartphone.

In step 102, the authentication section 40 displays, for example, an operation screen 84 as illustrated in FIG. 4 at the display section 28 of the smartphone 12. The operation screen 84 displays an icon 85 that is for instructing switching of the door lock of the vehicle into the locked state and an icon 86 that is for instructing switching of the door lock of the vehicle into the unlocked state. The operation screen 84 also displays an icon 87 that is for instructing opening/closing of a sliding door at the left side of the vehicle, an icon 88 that is for instructing opening/closing of a sliding door at the right side of the vehicle, an icon 89 that is for instructing opening of a back door of the vehicle, and a message 90 for giving notice of a remaining number of tokens stored in the token storage region 36. Processing when the icons in the operation screen 84 are touch-operated is described below.

In step 104, the authentication section 40 acquires an electromagnetic reception state between the smartphone 12 and the server 82 from the first wireless communications section 20, and sends the acquired electromagnetic reception state to the control ECU 48 of the vehicle side system 46. Accordingly, the control ECU 48 may recognize whether the smartphone 12 is in a state in which communication with the server 82 is possible (an operation mode is an online mode) or the smartphone 12 is in a state in which communication with the server 82 is interrupted (the operation mode is an offline mode).

In step 106, on the basis of the electromagnetic reception state acquired from the first wireless communications section 20 in step 104, the authentication section 40 makes a determination as to whether the smartphone 12 is in the state in which communication with the server 82 is interrupted. When the result of the determination in step 106 is negative, the authentication section 40 proceeds to step 108. In step 108, the authentication section 40 makes a determination as to whether the remaining number of tokens stored in the token storage region 36 is below a predetermined number X2 (X2<X1).

When the result of the determination in step 108 is negative, the authentication section 40 returns to step 102. When the result of the determination in step 108 is affirmative, the authentication section 40 returns to step 100. Hence, tokens may be appropriately downloaded from the server 82 while the operation mode of the smartphone 12 is the online mode (while the result of the determination in step 106 is negative) such that the remaining number of tokens stored in the token storage region 36 becomes larger than the predetermined number X2.

Alternatively, when the smartphone 12 is in the state in which communication with the server 82 is interrupted, for example, when the user carrying the smartphone 12 is in an underground parking garage or the like, the result of the determination in step 106 is affirmative and the authentication section 40 proceeds to step 110.

In step 110, the authentication section 40 switches the operation mode of the smartphone 12 to the offline mode. In step 112, the notification section 42 makes a determination as to whether the remaining number of tokens stored in the token storage region 36 is below a predetermined number X3 (X3<X1). When the result of the determination in step 112 is negative, the authentication section 40 proceeds to step 116.

In step 116, the authentication section 40 makes a determination as to whether the smartphone 12 is in the state in which communication with the server 82 is interrupted. When the result of the determination in step 116 is affirmative, the authentication section 40 returns to step 112 and, while the operation mode of the smartphone 12 is the offline mode (while the result of the determination in step 116 is affirmative), monitors whether the remaining number of tokens falls below the predetermined number X3.

Figure 5:
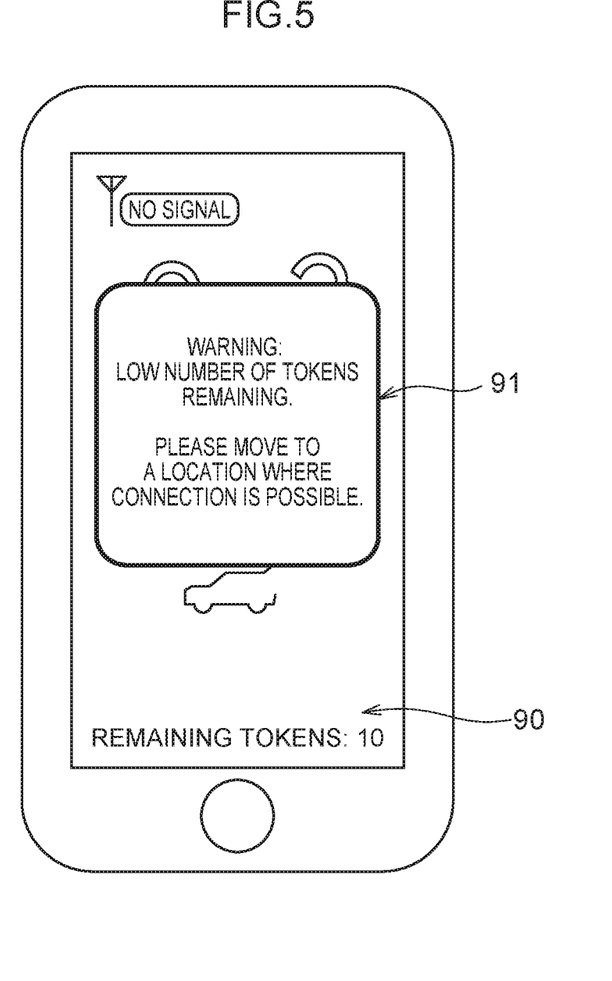
FIG. 5 is an image showing a message giving notice of a reduction in remaining tokens that is displayed at the display section of the smartphone.

When the remaining number of tokens falls below the predetermined number X3, the result of the determination in step 112 is affirmative and the authentication section 40 proceeds to step 114. In step 114, the notification section 42 displays a message 91 giving notice of the reduction in remaining tokens at the display section 28 of the smartphone 12, for example, as shown in FIG. 5. The notification section 42 also outputs a warning sound from the sound output section 32. Thus, the user carrying the smartphone 12 may be encouraged to promptly remedy the state in which communication with the server 82 is interrupted. When the processing of step 114 is executed, the authentication section 40 proceeds to step 116.

When the smartphone 12 is in the state in which communication with the server 82 is possible, the result of the determination in step 116 is negative and the authentication section 40 proceeds to step 118. In step 118, the authentication section 40 leaves the offline mode and switches the operation mode of the smartphone 12 to the online mode. Then the authentication section 40 proceeds to step 108.

Figure 6:
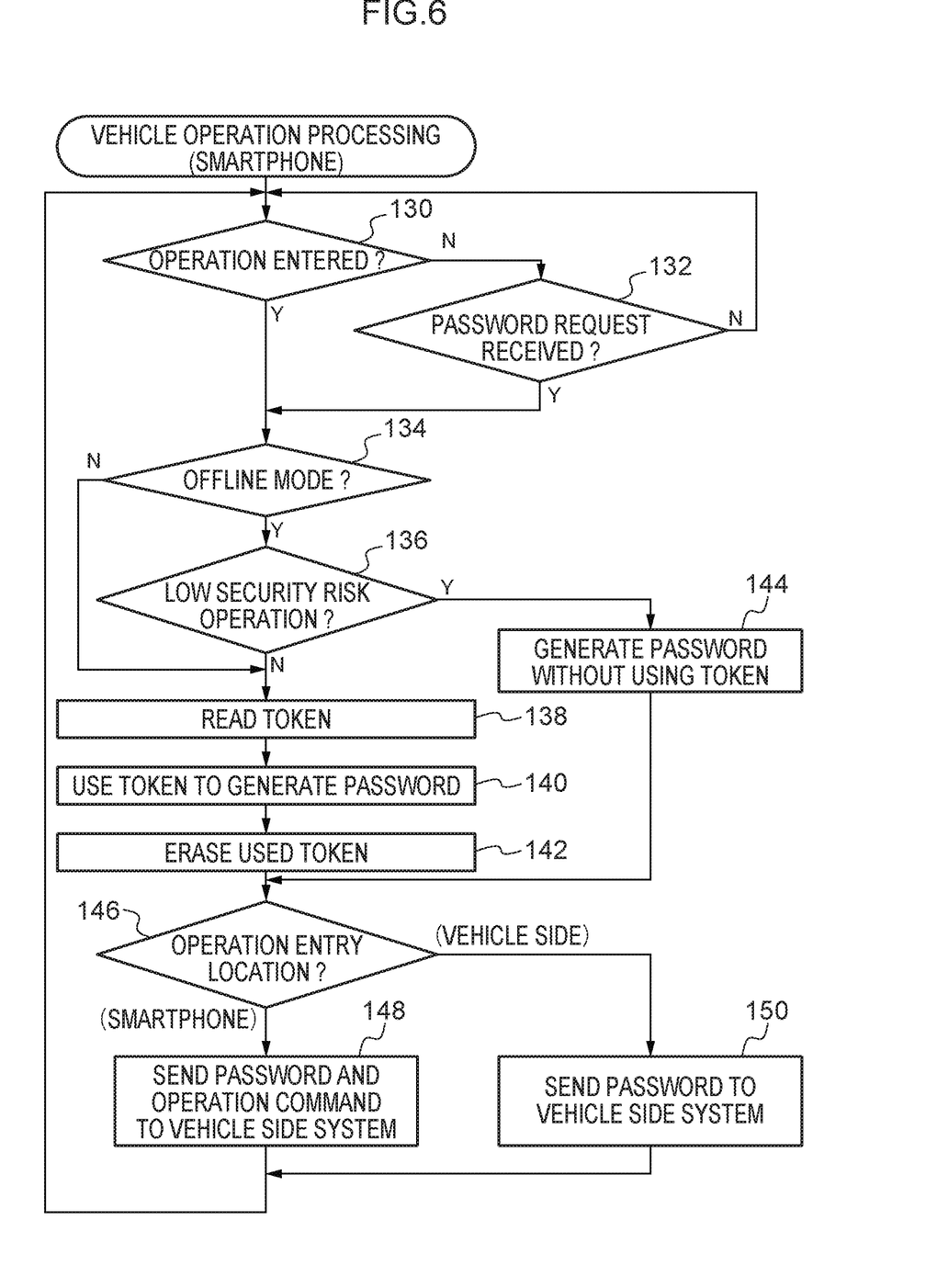
FIG. 6 is a flowchart of vehicle operation processing that is executed at the smartphone.

Now, the vehicle operation processing, which is executed by the smartphone 12 when the vehicle operation program 38 is being executed at the smartphone 12, is described with reference to FIG. 6.

In step 130 of the vehicle operation processing, the authentication section 40 makes a determination as to whether some operation of the vehicle has been entered at the smartphone 12 side via the entry section 30, by an arbitrary icon of the operation screen 84 being touch-operated. When the result of the determination in step 130 is negative, the authentication section 40 proceeds to step 132.

In step 132, the authentication section 40 makes a determination as to whether a password request has been received from the control ECU 48 of the vehicle side system 46. The smartphone 12 receives a password request from the control ECU 48 when the operation section 78 of the vehicle side system 46 is operated and some operation of the vehicle is entered at the vehicle side. The password request includes information representing the type of operation entered at the vehicle side. When the result of the determination in step 132 is negative, the authentication section 40 returns to step 130 and repeats the processing of steps 130 and 132 until the result of a determination in step 130 or step 132 is affirmative.

When some operation of the vehicle is entered at the smartphone 12 side, the result of the determination in step 130 is affirmative and the authentication section 40 proceeds to step 134. Alternatively, when some operation of the vehicle is entered at the vehicle side, the result of the determination in step 132 is affirmative and the authentication section 40 proceeds to step 134.

In step 134, the authentication section 40 makes a determination as to whether the current operation mode of the smartphone 12 is the offline mode. When the current operation mode of the smartphone 12 is the online mode, the result of the determination in step 134 is negative and the authentication section 40 proceeds to step 138.

In step 138, the authentication section 40 reads a token from the token storage region 36. Then, in step 140, the authentication section 40 uses the token read in step 138 to generate a password. In step 142, the authentication section 40 erases the token used for password generation in step 140, and the authentication section 40 proceeds to step 146.

On the other hand, when the current operation mode of the smartphone 12 is the offline mode, the result of the determination in step 134 is affirmative and the authentication section 40 proceeds to step 136. In step 136, the authentication section 40 makes a determination as to whether the operation of the vehicle entered at the smartphone 12 side or the vehicle side is a predetermined operation with a low security risk to the vehicle. Examples of predetermined operations with low security risks to the vehicle include the operation to switch the door lock of the vehicle into the locked state. Examples of operations other than the predetermined operations, which have high security risks to the vehicle, include the operation to switch the door lock of the vehicle into the unlocked state, an operation to start the engine 72 and so forth.

When the result of the determination in step 136 is affirmative, the authentication section 40 proceeds to step 144. In step 144, the authentication section 40 generates a password without using a token, and the authentication section 40 proceeds to step 146. Thus, when the current operation mode of the smartphone 12 is the offline mode and the entered operation of the vehicle is a predetermined operation with a low security risk to the vehicle, a password is generated without using a token. Although security of the generated password is slightly lower, unnecessary use of a token is avoided.

Alternatively, when the result of the determination in step 136 is negative, the authentication section 40 proceeds to step 138 and carries out the sequence of processing of, as described above, reading a token from the token storage region 36 (step 138), using the token that has been read to generate a password (step 140), and erasing the token that has been used (step 142).

In step 146, the authentication section 40 makes a determination as to whether the location at which the operation of the vehicle was entered is the smartphone 12 side or the vehicle side, and branches in accordance with the result of this determination. When the location at which the operation of the vehicle was entered is the smartphone 12 side, the authentication section 40 branches from step 146 to step 148. In step 148, the authentication section 40 sends the password that has been generated to the control ECU 48 of the vehicle side system 46, and also sends an operation command describing details of the operation of the vehicle entered at the smartphone 12 side.

Alternatively, when the location at which the operation of the vehicle was entered is the vehicle side, the authentication section 40 branches from step 146 to step 150. In step 150, the authentication section 40 sends the password that has been generated to the control ECU 48 of the vehicle side system 46. When the processing of step 148 or step 150 has been executed, the authentication section 40 returns to step 130.

Figure 7:
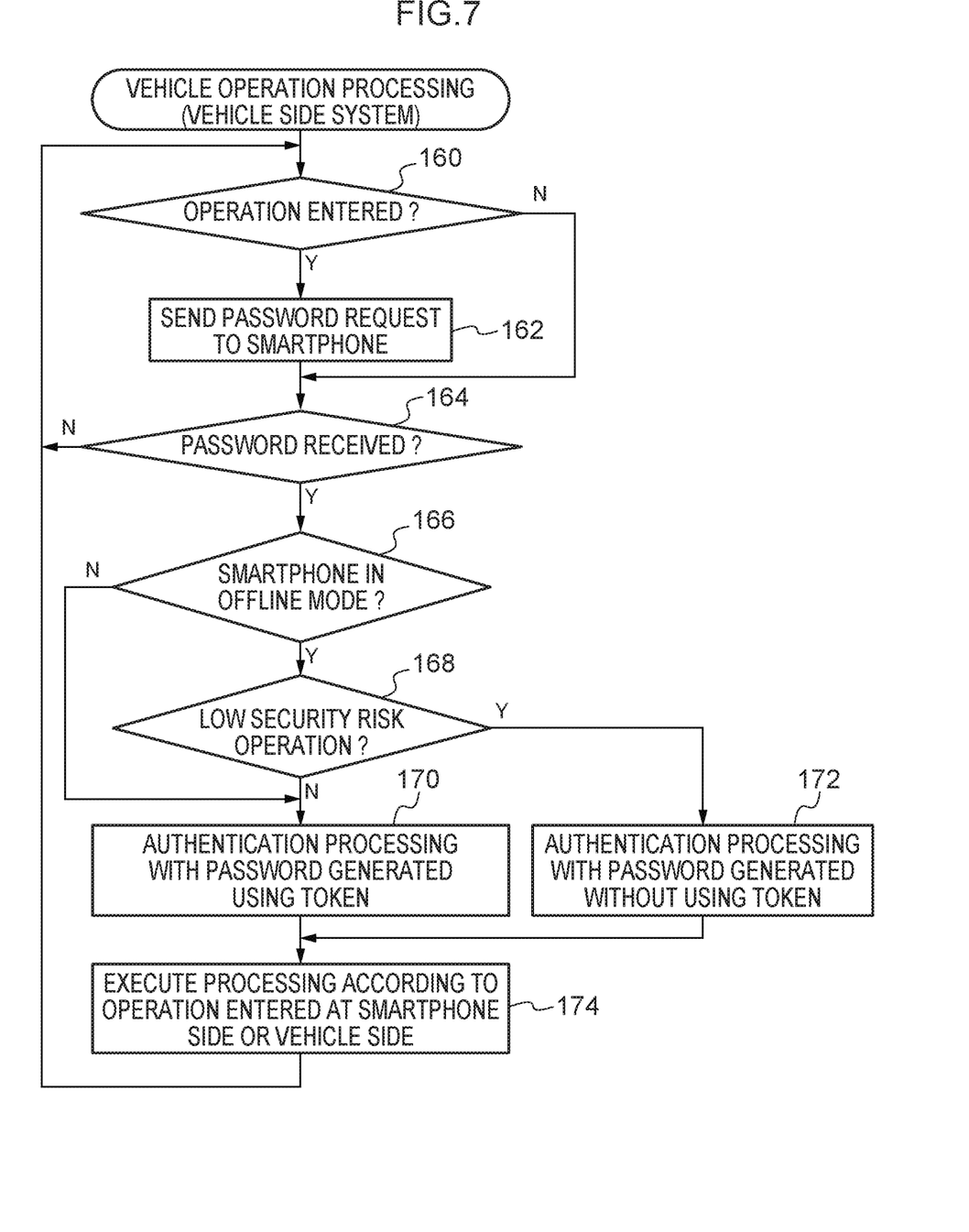
FIG. 7 is a flowchart of vehicle control processing that is executed at a vehicle side system.

Next, vehicle control processing that is executed by the control ECU 48 while an ignition switch of the vehicle is switched on is described with reference to FIG. 7.

In step 160, the control ECU 48 makes a determination as to whether the operation section 78 of the vehicle side system 46 has been operated and some operation of the vehicle has been entered at the vehicle side. When the result of the determination in step 160 is negative, the control ECU 48 proceeds to step 164. In step 164, the control ECU 48 makes a determination as to whether at least a password has been received from the smartphone 12. When the result of the determination in step 164 is negative, the control ECU 48 returns to step 160 and repeats the processing of steps 160 and 164 until the result of a determination in step 160 or step 164 is affirmative.

When the operation section 78 has been operated and some operation of the vehicle entered at the vehicle side, the result of the determination in step 160 is affirmative and the control ECU 48 proceeds to step 162. In step 162, the control ECU 48 sends a password request containing information representing the type of operation entered at the vehicle side to the smartphone 12. When the processing of step 162 has been executed, the control ECU 48 proceeds to step 164.

As described above, when some operation of the vehicle is entered at the smartphone 12 side, a password and operation command are sent from the smartphone 12 to the control ECU 48. When some operation of the vehicle is entered at the vehicle side, in response to a password request that the control ECU 48 sends to the smartphone 12, a password is sent from the smartphone 12 to the control ECU 48. Thus, when information containing at least a password is received from the smartphone 12, the result of the determination in step 164 is affirmative and the control ECU 48 proceeds to step 166.

In step 166, the control ECU 48 makes a determination as to whether the current operation mode of the smartphone 12 is the offline mode. When the current operation mode of the smartphone 12 is the online mode, the result of the determination in step 166 is negative and the control ECU 48 proceeds to step 170. In step 170, the control ECU 48 generates a token from the token generation logic, and uses the password received from the smartphone 12, which is to say a password generated using a token, to conduct authentication processing. When the authentication processing is successful, the control ECU 48 proceeds to step 174.

On the other hand, when the current operation mode of the smartphone 12 is the offline mode, the result of the determination in step 166 is affirmative and the control ECU 48 proceeds to step 168. In step 168, the control ECU 48 makes a determination as to whether the operation of the vehicle entered at the smartphone 12 side or the vehicle side is a predetermined operation with a low security risk to the vehicle.

When the result of the determination in step 168 is affirmative, the control ECU 48 proceeds to step 172. In step 172, the control ECU 48 conducts authentication processing on the password received from the smartphone 12, which is to say a password generated without using a token, without generating a token from the token generation logic. When the authentication processing is successful, the control ECU 48 proceeds to step 174. Alternatively, when the result of the determination in step 168 is negative, the control ECU 48 proceeds to step 170 and, as described above, conducts authentication processing on the password received from the smartphone 12 that has been generated using a token.

When the authentication processing in step 170 or step 172 is successful, in step 174 the control ECU 48 executes processing according to the operation of the vehicle entered at the smartphone 12 side or the vehicle side, and then returns to step 160.

For example, when an operation to switch the door lock of the vehicle to the locked state or the unlocked state is entered, the control ECU 48 executes processing to command the door lock ECU 66 to switch the door lock of the vehicle to the locked state or the unlocked state. As another example, when an operation to start or stop the engine 72 is entered, the control ECU 48 executes processing to command the start-up ECU 70 to start or stop the engine 72. As a further example, when an operation to open or close a door of the vehicle (for example, a sliding door at the rear seat of the vehicle, the back door or the like) is entered, the control ECU 48 executes processing to command the door opening/closing ECU 74 to open or close the door of the vehicle.

In the present exemplary embodiment as described above, the storage section 18 of the smartphone 12 stores tokens received from the server 82 to be used for authentication to the vehicle. When the authentication section 40 of the smartphone 12 is in a state in which communication with the server 82 is possible and an operation of the vehicle is performed, the authentication section 40 uses a token to conduct authentication to the control ECU 48 of the vehicle side system 46. When the authentication section 40 of the smartphone 12 is in a state in which communication with the server 82 is interrupted and a predetermined operation of the vehicle is performed, the authentication section 40 conducts authentication to the control ECU 48 of the vehicle side system 46 without using a token. Therefore, when communication with the server 82 is interrupted, unnecessary use of a token may be avoided, and a decline into a state in which operation of the vehicle is not possible may be suppressed.

In the present exemplary embodiment, the predetermined operations are operations with low security risks to the vehicle. Therefore, because an operation with a low security risk to the vehicle is being performed when authentication to the vehicle is conducted without using a token in the state in which communication with the server 82 is interrupted, security of the vehicle may be improved.

In the present exemplary embodiment, when an operation of the vehicle other than the predetermined operations is to be performed in the state in which communication with the server 82 is interrupted, authentication to the control ECU 48 of the vehicle side system 46 is conducted using a token. Therefore, in the state in which communication with the server 82 is interrupted, security may be assured even when an operation of the vehicle other than the predetermined operations is performed.

In the present exemplary embodiment, when an operation of the vehicle is entered via the entry section 30 of the smartphone 12, the authentication section 40 sends an operation command to the control ECU 48 of the vehicle side system 46. Thus, the control ECU 48 of the vehicle side system 46 may recognize that the operation of the vehicle has been entered via the entry section 30 of the smartphone 12.

In the present exemplary embodiment, when the smartphone 12 is in the state in which communication with the server 82 is interrupted and the remaining number of tokens stored in the storage section 18 is less than or equal to a predetermined value, the notification section 42 of the smartphone 12 gives notice of the reduction in remaining tokens. Thus, the user carrying the smartphone 12 may be encouraged to promptly remedy the state in which communication with the server 82 is interrupted.

In the present exemplary embodiment, the notification section 42 gives the notice of a reduction in remaining tokens by causing a display at the display section 28 of the smartphone 12 or causing an output of sound from the sound output section 32 of the smartphone 12. Therefore, an impression is made on the vision or hearing of the user carrying the smartphone 12 and the user may assuredly be made aware of the reduction in remaining tokens.

In the present exemplary embodiment, the storage section 18 of the smartphone 12 stores plural tokens that have been received from the server 82 in the state in which communication with the server 82 is possible. Therefore, a duration until the remaining number of tokens stored in the storage section 18 falls below the predetermined value may be made longer.

In the present exemplary embodiment, when the authentication section 40 uses a token to conduct authentication to the control ECU 48 of the vehicle side system 46, because a token that has not been used previously for authentication to the control ECU 48 is used, security of the vehicle may be improved.

In the descriptions above, a situation is described in which the control ECU 48 of the vehicle side system 46 recognizes whether the operation mode of the smartphone 12 is the offline mode by the control ECU 48 explicitly sending the electromagnetic reception state between the smartphone 12 and the server 82 to the control ECU 48 (step 104 in FIG. 3). However, this is not limiting. For example, the control ECU 48 may automatically detect the operation mode of the smartphone 12, by the smartphone 12 and the control ECU 48 sending and receiving states to and from one another when performing wireless communications. Further, because functions for performing wireless communications with the server 82 are incorporated in the vehicle side system 46, the control ECU 48 may assess whether or not the smartphone 12 is in the state in which communication with the server 82 is possible on the basis of whether or not the vehicle side system 46 is in a state in which communication with the server 82 is possible.

The meaning of the term "operation" as used in the present disclosure is not limited to operations in which a user enters an instruction but may include operations such as, for example, a user taking the smartphone 12 out of the vehicle in a state in which the engine 72 is running and the like. An operation to take the smartphone 12 out of the vehicle in the state in which the engine 72 is running may correspond to, for example, an operation with a low security risk; when this operation is performed, the vehicle side system 46 may execute processing to output a warning or the like.

In the descriptions above, a situation is described in which the vehicle operation program 38 according to the present disclosure is stored in advance (installed) in the storage section 18. However, the vehicle operation program according to the present disclosure may be stored and provided on a non-transitory storage medium such as a CD-ROM, a DVD-ROM or the like and executed by a processor such as the CPU 14 or the like.

What is claimed is:

1. A vehicle operation device comprising a memory and a processor, the processor being configured to:
   store a token to be used for authentication to a vehicle in the memory, the token being received from a server;
   when an operation of the vehicle is performed in a state in which communication with the server is possible, use the token to conduct authentication to the vehicle; and
   when a predetermined operation of the vehicle is performed in a state in which communication with the server is interrupted, conduct authentication to the vehicle without using the token,
   wherein the processor is configured to, when a remaining number of tokens stored in the memory is less than or equal to a predetermined value in the state in which communication with the server is interrupted, give notice of a reduction in remaining tokens.

2. The vehicle operation device according to claim 1, wherein the predetermined operation is an operation with a low security risk to the vehicle.

3. The vehicle operation device according to claim 1, wherein the processor is configured to, when an operation of the vehicle other than the predetermined operation is performed in the state in which communication with the server is interrupted, use the token to conduct authentication to the vehicle.

4. The vehicle operation device according to claim 1, wherein the processor is configured to, when an operation of the vehicle is entered, send an operation command to the vehicle.

5. The vehicle operation device according to claim 1, wherein the processor is configured to give the notice by at least one of causing a display or causing an output of sound.

6. The vehicle operation device according to claim 1, wherein the processor is configured to store a plurality of tokens in the memory, the tokens being received from the server in the state in which communication with the server is possible.

7. The vehicle operation device according to claim 1, wherein the processor is configured to, when using the token to conduct authentication to the vehicle, use a token that has not been used previously for authentication to the vehicle.

8. A vehicle operation method comprising, by a processor:
   storing a token to be used for authentication to a vehicle in a memory, the token being received from a server;
   when an operation of the vehicle is performed in a state in which communication with the server is possible, using the token to conduct authentication to the vehicle; and
   when a predetermined operation of the vehicle is performed in a state in which communication with the server is interrupted, conducting authentication to the vehicle without using the token,
   wherein, when a remaining number of tokens stored in the memory is less than or equal to a predetermined value in the state in which communication with the server is interrupted, the processor gives notice of a reduction in remaining tokens.

9. The vehicle operation method according to claim 8, wherein, when an operation of the vehicle other than the predetermined operation is performed in the state in which communication with the server is interrupted, the processor uses the token to conduct authentication to the vehicle.

10. The vehicle operation method according to claim 8, wherein, when an operation of the vehicle is entered, the processor sends an operation command to the vehicle.

11. The vehicle operation method according to claim 8, wherein the processor gives the notice by at least one of causing a display or causing an output of sound.

12. The vehicle operation method according to claim 8, wherein the processor stores a plurality of tokens in the memory, the tokens being received from the server in the state in which communication with the server is possible.

13. A non-transitory computer readable storage medium storing a program executable by a processor to perform vehicle operation processing, the vehicle operation processing comprising:
  storing a token to be used for authentication to a vehicle in a memory, the token being received from a server;
  when an operation of the vehicle is performed in a state in which communication with the server is possible, using the token to conduct authentication to the vehicle; and
  when a predetermined operation of the vehicle is performed in a state in which communication with the server is interrupted, conducting authentication to the vehicle without using the token,
  wherein the vehicle operation processing includes, when a remaining number of tokens stored in the memory is less than or equal to a predetermined value in the state in which communication with the server is interrupted, giving notice of a reduction in remaining tokens.

14. The non-transitory storage medium according to claim 13, wherein the vehicle operation processing includes, when an operation of the vehicle other than the predetermined operation is performed in the state in which communication with the server is interrupted, using the token to conduct authentication to the vehicle.

15. The non-transitory storage medium according to claim 13, wherein the vehicle operation processing includes, when an operation of the vehicle is entered, sending an operation command to the vehicle.

16. The non-transitory storage medium according to claim 13, wherein the vehicle operation processing includes giving the notice by at least one of causing a display or causing an output of sound.

* * * * *